United States Patent [19]

Farkas et al.

[11] Patent Number: 4,604,448
[45] Date of Patent: Aug. 5, 1986

[54] MOULDING COMPOSITIONS FROM MELAMINE-FORMALDEHYDE RESOLES

[75] Inventors: Robert Farkas, Bishops Stortford; Lothar M. Hohmann, London, both of England

[73] Assignee: Polymer Tectonics, Limited, London, England

[21] Appl. No.: 711,568

[22] PCT Filed: Jul. 10, 1984

[86] PCT No.: PCT/GB84/00247
§ 371 Date: Mar. 11, 1985
§ 102(e) Date: Mar. 11, 1985

[87] PCT Pub. No.: WO85/00374
PCT Pub. Date: Jan. 31, 1985

[30] Foreign Application Priority Data

Jul. 14, 1983 [GB] United Kingdom ............... 8319106

[51] Int. Cl.$^4$ ..................... C08G 12/32; C08L 61/24; C08L 61/28
[52] U.S. Cl. ..................................... 528/232; 521/88; 521/141; 521/188; 524/598; 525/398; 528/254; 528/256
[58] Field of Search ...................... 528/232, 254, 256; 521/88, 141, 188; 524/598; 525/398

[56] References Cited

U.S. PATENT DOCUMENTS

| | | | |
|---|---|---|---|
| 3,351,615 | 11/1967 | Gordon | 528/256 |
| 3,479,247 | 11/1968 | Bonzagni | 528/254 X |
| 4,192,923 | 3/1980 | Tajkowski | 528/254 X |
| 4,303,561 | 12/1981 | Piesch et al. | 528/254 X |

FOREIGN PATENT DOCUMENTS 1081506 8/1967 United Kingdom .
1108127 4/1968 United Kingdom .

Primary Examiner—Lucille M. Phynes
Attorney, Agent, or Firm—Cushman, Darby & Cushman

[57] ABSTRACT

A moulding composition which forms stable, durable mouldings which are color stable, have good water resistance and can be glass clear and fire-resistant, comprises a melamine-formaldehyde resole of mole ratio melamine:formaldehyde in the range 1:1.1 to 1:5.0, and from 20 to 80% by weight, based on the resole, of a glycol or glycol derivative. The composition may also contain one or more of water, polyvinyl alcohol, aluminium hydroxide and reinforcing fillers. The melamine in the resole may be partially replaced with urea. Cure of the resin composition, after shaping, takes place at a pH of at least 6.0, and is accelerated by boron oxide and also by microwave heating. Foamed products are especially useful.

23 Claims, No Drawings

MOULDING COMPOSITIONS FROM MELAMINE-FORMALDEHYDE RESOLES

This invention relates to moulding compositions, and is especially concerned with moulding compositions based on melamine-formaldehyde resins. It is more especially concerned with the provision of a novel series of readily handleable and curable resins which lead to the production of stable, durable mouldings which are colour stable, have good water resistance, and in some embodiments are glass-clear and fire-resistant.

Melamine-formaldehyde resins and moulding compositions based thereon are widely known and used. The resins are produced by partially condensing a mixture of melamine and formaldehyde, suitably with the assistance of an acidic or alkali catalyst, to the stage at which a resole resin is formed. This resin is then shaped, e.g. in a mould to produce a molded object or a surface coating or lamination, and its cure is completed by heating and/or by catalytic effect. The manufacture and use of such resins are comprehensively described in the literature.

Melamine-formaldehyde moulding compounds are normally sold at normal temperatures and pressures, i.e. 20° C. and usually at least up to 50° C., and are usually heavily filled with fibrous or non-fibrous materials, for example cellulose-based materials. They are normally moulded at a pressure over 400 p.s.i., and at a temperature in excess of 120° C. The resultant moulded articles are usually opaque and are not weather resistant. Cure of the melamine-formaldehyde moulding compounds may be assisted by the use of acid catalysts. The resins are brittle and prone to shrinkage. Unless heavily reinforced, the mouldings made from them will crack on ageing.

It is an object of the present invention to provide a melamine-formaldehyde moulding composition which does not suffer from the disadvantages of presently known melamine-formaldehyde moulding compositions. It is a further object of the invention to provide a method of forming shaped articles using the novel melamine-formaldehyde moulding compositions.

According to the invention a moulding composition comprises (i) a melamine-formaldehyde resole in which the mole ratio melamine:formaldehyde is in the range 1:1.1 to 1:5.0, and (ii) a glycol or glycol derivative in an amount between 20 and 80%, suitably between 25 and 80%, by weight, based on the weight of solid melamine-formaldehyde resole.

Further according to the invention, a method of forming shaped articles comprises moulding into shape a composition as aforesaid and causing said moulding to cure at a pH of 6.0 or greater, preferably at least 7.5.

The melamine-formaldehyde resoles may be acid-or alkali-catalysed condensates of melamine and formaldehyde, of preferred molar ratio 1:1.2 to 1:4.0, most preferably 1:1.2 to 1:3.0.

It is believed that the glycol component of the moulding composition functions as a reactive solvent, a proportion of the glycol condensing with the methylol groups of the methylol melamine resole whilst curing, to produce unreactive ether side chains. The chemically-bound glycol behaves as an internal plasticiser and retards the rate of polymerisation and cross-linking, thereby controlling the molecular weight and density of cross-linking of the ultimate product. Uncombined glycol dissolves the resin, and functions as an external plasticiser. The overall effect of the use of glycol in the manner proposed by the invention is to improve the clarity, resilience, toughness dimensional stability and weathering performance of the cured resin. Preferably the glycol or glycol derivative is present in the moulding composition of the invention in an amount between 30% and 70% by weight, e.g. between 45 and 70% by weight, based on the melamine-formaldehyde resin.

Suitable glycols include those lower glycols which are liquid at room temperature, and whose molecules contain reactive primary and/or secondary hydroxyl groups. As specific examples there may be mentioned ethylene glycol, triethylene glycol, monopropylene glycol, dipropylene glycol, tripropylene glycol, butylene glycol, polyethylene glycols and polypropylene glycols. Particularly suitable glycols are monopropylene glycol, dipropylene glycol, triethylene glycol, monoethylene glycol and polyethylene glycols of low average molecular weight, the first three in this list being especially preferred. Glycol derivatives such as monoglyceryl cresyl ether and substituted polypropylene glycols are also useful as the glycol component of the compositions of the invention. It should be noted that a mixed solvent, containing more than one glycol component, may be used in accordance with the invention. The moulding compositions may also contain a minor proportion of water, for example up to 25% by weight based on the weight of the melamine formaldehyde resole, and suitably in an amount not greater than 20% by weight of the total resole for unfilled compositions, and up to 35%, e.g. 15 to 20%, for filled compositions. It is found that the presence of water in the composition enhances the solubility of the melamine-formaldehyde resins, reduces the viscosity of the resin syrup, thereby facilitating handling, contributes to the fire retardance of the cured resins, improves moulding properties, and leads to improved transparency of the cured moulded product.

The compositions of the invention are suitably produced by dissolving the melamine-formaldehyde resole, possibly in the form of a spray-dried powder, in the glycol, or mixture of glycols, or mixture of glycol(s)-/water, with stirring at a temperature in the range 70°–100° C., to produce a stable resin syrup. This syrup flows readily at low temperature, i.e. between 15° C. and 50° C., the viscosity of the syrup depending upon the mole ratio of the melamine-formaldehyde resin, and the precise proportions of resin, glycol and water in the composition.

The moulding compositions of the invention may also contain a small proportion of polyvinyl alcohol, suitably in an amount up to 20% by weight, based on the weight of the melamine-formaldehyde resole. The polyvinyl alcohol has the effect of reducing shrinkage in products made from the compositions, and it also makes the products more acid-resistant, i.e. effectively more weather-resistant. Further, it enables a faster cure of the resin, at a lower pH. The polyvinyl alcohol may be mixed into the other ingredients during production of the moulding composition; suitably it is added as a solution in the water (preferably hot) or glycol-water mixture. For example, the polyvinyl alcohol may be dissolved in a hot aqueous solution containing a relatively large amount of glycol and a relatively small amount of resole, which solution is then added to a glycol-water resole mixture to provide the requisite proportions of ingredients.

In producing moulded articles according to the invention, a resin syrup produced as above is moulded into the required shape, e.g. by casting or extrusion, and its pH is adjusted to be at least 6.0, preferably at least 7.2. If colourless mouldings are required, the curing pH should not be allowed to exceed 10.0. Suitably the curing pH is in the range 7.5–9.5 at 50°±0.5° C. If curing is conducted at a pH below 7.2, the resultant moulded articles may be brittle and tend to crack unless the moulding composition contains polyvinyl alcohol, in which case curing may be conducted at a pH as low as 6.0. without detriment to the moulded products. If curing is conducted at a pH greater than 10, the resultant moulded articles tend to discolour too readily.

Curing preferably takes place at a temperature between 80° C. and 120° C., suitably between 90° and 105° C. Thus, the shaped composition may be stoved at this temperature for 2.5 hours in a thermostatically-controlled circulating air oven. The presence of an accelerator, such as boron oxide (see below), will reduce the curing time, for example by up to 2 hours. The use of microwave heating can reduce the curing time still further, and, for examle using an accelerator, curing times with the use of microwave heating can be as little as 1 to 3 minutes. Microwave heating uses frequencies in the range 900 to 2500 MHz. High frequency heating at 27 to 65 MHz, may also be utilised for curing, leading to curing times of the order of 15 minutes.

The precise conditions of curing will be dependent upon the precise formulation of the moulding composition, the mould design and the pressure. It is noted, however, that the temperature of curing is very much lower than the temperatures used for curing presently available melamine-formaldehyde moulding compounds. Furthermore, the compositions of the invention may be cured without the use of pressure.

A typical moulding composition in accordance with the invention comprises the following ingredients:
(a) an acid-or alkali-cataylsed melamine-formaldehyde condensate having a melamine:formaldehyde molar ratio of 1.0:1.2 to 1.0:3.0;
(b) dipropylene glycol, in an amount of 0 to 70% by weight, based on the weight of (a);
(c) triethylene glycol, in an amount of 0 to 70% by weight, based on the weight of (a), the total of (b) and (c) being between 40 and 70% by weight of the weight of (a);
(d) water, from 0 to 30%, preferably 10 to 25% by weight based on (a).

2-Methoxyethanol or 2-ethoxyethanol may additionally be present, at concentrations not greater than 15% by weight, based on the weight of the melamine-formaldehyde condensate (a).

We have described above the production of moulding compositions of the invention by dissolving a melamine-formaldehyde resole in a glycol-containing solvent. In a modification, the composition may be formed by producing the resole "in situ", i.e. by reacting suitable proportions of melamine and formaldehyde, in the presence of the glycol or glycol derivatives, under mildly acidic or alkaline conditions. The formaldehyde may be used in the form of formalin, optionally in admixture with the solid paraformaldehyde.

Curing after shaping of the moulding composition of the present invention may be assisted by the presence of boron oxide as accelerator. Boron oxide also has the effect of desiccating the moulding, and hydrolyses to boric acid which also has the effect of accelerating the cure of the resin by Le Chatelier's principle. Boron oxide is suitably present in the composition in an amount in the range 2–20% by weight, based on the weight of the resin content of the composition. It is suitably added as a hot, clear solution in a glycol, of preferred concentration 10–20% by weight. In order to maintain a mildly alkaline pH whilst curing and so prevent the possibility of resin cracking, boric oxide may be used in conjunction with alkali or an alkaline buffer such as borax. Mouldings whose compositions are devoid of solid additives still retain glass-clear transparency.

The compositions of the invention may also contain aluminium hydroxide, otherwise known as "alumina trihydrate". This material is well known as conferring good fire-retardant and smoke suppressing properties on thermosetting resins, particularly those used in the production of foams. Hitherto, it has not been possible to incorporate alumina trihydrate in moulding compositions based on melamine-formaldehyde resins, since previously such resins have normally been acid-cured, and the presence of acid at the curing stage is incompatible with alumina trihydrate, with which it reacts. The compositions of the present invention are suitably cured at a pH level of 7.2 or greater, which means that there is no acid present to react with the alumina trihydrate. Alumina trihydrate may be present in the moulding compositions of the invention in an amount in the range 80–550%, by weight, based on the melamine-formaldehyde resin component of the composition. The presence of alumina trihydrate substantially increases the fire resistance and smoke suppressing capability of shaped articles made according to the invention. In a fire, the alumina trihydrate endothermically decomposes and dehydrates with evolution of water. If used alone, a preferred maximum of 260% alumina trihydrate by weight of the base MF resin may be incorporated into the syrup prior to curing. However, for producing low pressure moulding compounds, if used together with boric oxide between 140% and a preferred maximum of 210% by weight alumina trihydrate may be included, depending on the formulation. For dough moulding compositions, higher proportions of alumina trihydrate may be used.

The invention also includes a modification of the moulding compositions described hitherto, wherein up to 30% by weight of the melamine in the composition is replaced with urea. Thus, the composition may contain both a melamine-formaldehyde resole and a urea-formaldehyde resole; or the composition may contain a melamine-urea-formaldehyde co-condensate. In the modified compositions the mole ratio melamine: formaldehyde is as above, i.e. 1:1.1 to 1:5.0, and the mole ratio urea:formaldehyde is preferably in the range 1:1.6 to 1:2. The glycol/glycol derivative, water pva and other additives described above may also be present in the modified compositions, but their proportions will be based on the total weight of resin in the composition, not simply on the weight of melamine-formaldehyde resole.

Substituting the melamine by the cheaper urea to a maximum extent of 30% by weight leads to significant economy without undue sacrifice of the advantageous properties of the melamine-formaldehyde condensates.

The moulding compositions of the invention may be formed into shape in a variety of ways. Amongst these may be especially mentioned the hand lay-up and spray-up processes (particularly where fibre reinforcement is included), injection moulding, casting, including rotational moulding, "pre-preg" moulding, vacuum moulding and filament winding. These processes are useful for low pressure (i.e. up to 200 p.s.i.) moulding and produce transparent or translucent mouldings and castings, with or without fibrous or other transparent or translucent reinforcements. Opaque low pressure mouldings or castings can be produced with fillers and/or reinforcements and/or pigments.

Medium or high pressure (i.e. 200 p.s.i. and upwards) transparent, translucent and opaque mouldings can be produced using resin injection, resin transfer, dough or sheet moulding, hot press moulding, pultrusion, extrusion and pre-preg moulding techniques.

It will thus be seen that the present invention provides a series of novel moulding compositions, which do not require the presence of fillers and reinforcements for their strength and stability, nor the use of pressure and high temperatures to cure them. The moulded articles can be glass-clear and colour-stable, and fire-resistance is an added benefit. Since the compositions are curable without the necessity to use strong acids or alkalis, they do not exhibit a corrosive effect on the apparatus with which they are used.

Allthough the compositions of the invention do not require the inclusion of fillers for many applications, nevertheless in some applications the addition of fillers is of advantage. Suitable fillers include magnesium carbonate, magnesium hydroxide, magnesite, silica, clay, talc, mica, dolomite, calcium carbonate and other mineral fillers. Reinforcing fibres may also be present for some applications, and here may be mentioned, by way of example, glass, nylon, cellulose and other organic fibres; metal fibres; silicate based and other mineral fibres.

The compositions of the invention have many applications, and may be used, for example, in the manufacture of plain, ribbed or corrugated roof sheeting, enabling buildings to be illuminated by natural daylight. Such sheeting may suitably be used in, for example, industrial units, workshops, offices, halls and recreational areas. Other uses include the structural repair of buildings and the cladding of tanks in oil refineries. That they are particularly suitable for these applications is shown by the fact that, in tests, mouldings made from the compositions of the invention showed negligible discolouration upon irradiation with ultra-violet light over several days, and showed negligible ingress of water upon immersing in water for seven days at room temperature.

The compounds of the invention are also susceptible to foaming, producing foamed products. The foams may be either filled or unfilled, translucent or opaque. Those containing alumina trihydrate have particularly good fire-resistant properties. Suitable blowing agents include low boiling hydrocarbons and halogenated hydrocarbons such as pentane, Arcton and methylene chloride and gases such as carbon dioxide, air or nitrogen introduced from external sources or chemically in situ.

When used for the production of surface coatings or adhesives, the resin compounds can be applied neat or diluted with various solvents, such as water, alcohols or glycol ethers. The coatings should be hot cured, suitably between 70° C. and 130° C., approximately.

Adhesion to many common substrates is good, particularly to many organic materials.

The following Examples illustrate the formulations of typical moulding compositions according to the invention.

EXAMPLE 1

| | |
|---|---|
| Spray-dried MF condensate of molar ratio melamine to formaldehyde 1.0 to 1.5 | 100 parts by weight |
| dipropylene glycol | 40 parts by weight |
| triethylene glycol | 25 parts by weight |
| water | 15 parts by weight | pH adjusted to 7.8 with 30% w/w aqueous potassium hydroxide. This material produces transparent mouldings.

EXAMPLE 2

| | |
|---|---|
| Spray-dried MF condensate of molar ratio melamine to formaldehyde 1.0 to 1.5 | 70 parts by weight |
| spray-dried UF condensate of molar ratio urea to formaldehyde 1.0 to 2.0 | 30 parts by weight |
| dipropylene glycol | 50 parts by weight |
| triethylene glycol | 5 parts by weight |
| water | 20 parts by weight | pH adjusted to 8.0 with 30% w/w aqueous sodium hydroxide.

EXAMPLE 3

| | |
|---|---|
| Spray-dried MF condensate of molar ratio melamine to formaldeyde 1.0 to 2.0 | 100 parts by weight |
| dipropylene glycol | 10 parts by weight |
| triethylene glycol | 10 parts by weight |
| water | 5 parts by weight |
| hot 20% w/w solution of $B_2O_3$ in dipropylene glycol | 50 parts by weight | pH adjusted to 7.6 with 30% aqueous sodium hydroxide.

EXAMPLE 4

| | |
|---|---|
| An MF condensate of molar ratio melamine to formaldehyde 1.0 to 2.5 | 100 parts by weight |
| dipropylene glycol | 20 parts by weight |
| triethylene glycol | 35 parts by weight |
| water | 15 parts by weight |
| aluminium hydroxide | 150 parts by weight | pH adjusted to 7.8 with 30% aqueous potassium hydroxide.

EXAMPLE 5

| | |
|---|---|
| Spray-dried MF condensate of molar ratio melamine to formaldehyde 1.0 to 3.0 | 100 parts by weight |
| triethylene glycol | 10 parts by weight |
| water | 15 parts by weight |
| boric oxide | 5 parts by weight |
| hot 20% w/w solution of boric oxide in dipropylene glycol | 40 parts by weight |
| aluminium hydroxide | 100 parts by weight | pH adjusted to 7.6 with 30% aqueous potassium hydroxide.

EXAMPLE 6

Foaming Composition

| | |
|---|---|
| An MF condensate of molar ratio melamine to formaldehyde 1.0 to 3.0 | 100 parts by weight |
| water | 10 parts by weight |
| hot 20% w/w solution of boric oxide in DPG | 65 parts by weight | pH adjusted to 7.6 with 30% w/w aqueous potassium hydroxide

| | |
|---|---|
| boric oxide powder | 5 parts by weight |
| aluminium hydroxide | 120 parts by weight |
| methylenechloride | 8 parts by weight |

EXAMPLE 7

Foaming Composition

| | |
|---|---|
| An MF condensate of molar ratio melamine to formaldehyde of 1.0 to 3.0 | 100 parts by weight |
| water | 100 parts by weight |
| dipropylene glycol | 15 parts by weight |
| polyvinyl alcohol | 40 parts by weight |
| | 8 parts by weight | pH adjusted to 7.2 with 30% w/w aqueous potassium hydroxide

| | |
|---|---|
| boric oxide powder | 5 parts by weight |
| aluminium hydroxide | 150 parts by weight |
| methylene chloride | 8 parts by weight |

EXAMPLE 8

Foaming Composition

| | |
|---|---|
| An MF condensate of molar ratio melamine to formaldehyde of 1.0 to 3.0 | 85 parts by weight |
| A UF condensate of molar ratio urea to formaldehyde of 1.0 to 1.8 | 15 parts by weight |
| water | 15 parts by weight |
| dipropylene glycol | 40 parts by weight |
| polyvinyl alcohol | 8 parts by weight | pH adjusted to 7.2 with 30% w/w aqueous potassium hydroxide.

| | |
|---|---|
| boric oxide | 5 parts by weight |
| aluminium hydroxide | 150 parts by weight |
| Arcton | 8 parts by weight |

EXAMPLE 9

A composition was produced from the following ingredients:

| | |
|---|---|
| An MF resole of molar ratio M:F of 1:3 | 100 parts by weight |
| dipropylene glycol | 25 parts by weight |
| triethylene glycol | 25 parts by weight |
| water | 23 parts by weight |
| polyvinyl alcohol | 8 parts by weight |

The pH was adjusted to 7.0 to 7.2.

The composition cures at 95°–120° C. to give transparent or translucent, practically colourless mouldings, with good weather resistance and good fire resistance.

EXAMPLE 10

A composition was produced from the following ingredients:

| | |
|---|---|
| An MF resole of molar ratio M:F of 1:2.5 | 85 parts by weight |
| A UF resole of molar ratio U:F of 1:1.8 | 15 parts by weight |
| water | 28 parts by weight |
| polyvinyl alcohol | 10 parts by weight |
| dipropylene glycol | 30 parts by weight |
| triethylene glycol | 25 parts by weight |

The pH of this composition was adjusted to 6.7 to 7.4.

A sample of the composition was cured in an open mould at approximately 97° C. Another sample was cured in a closed mould at above 100° C. under a pressure not exceeding 200 p.s.i. The cure times, using conducted heat, were approximately 6 minutes, and the moulded products were transparent or translucent, and self-extinguishing when a flame was applied to them.

By the use of microwave or high frequency heating, the above cure times could be approximately halved. By adding 5 parts by weight boron oxide per 100 parts resole, the cure times can be reduced by 40–60%.

We claim:

1. A moulding composition comprising (i) a melamine-formaldehyde resole in which the mole ratio melamine:formaldehyde is in the range 1:1.1 to 1:5.0, and (ii) a glycol in an amount between 20 and 80% by weight, based on the weight of solid melamine-formaldehyde resole.

2. A composition as claimed in claim 1 in which the mole ratio of melamine:formaldehyde in the resole is in the range 1:1.2 to 1:3.0.

3. A composition as claimed in claim 1 in which the glycol is present in an amount between 30 and 70% by weight, based on the weight of the melamine-formaldehyde resole.

4. A composition as claimed in claim 1 in which the glycol is monopropylene glycol, dipropylene glycol or triethylene glycol.

5. A composition as claimed in claim 1 containing also a minor proportion of water.

6. A composition as claimed in claim 1 containing also polyvinyl alcohol in an amount up to 20% by weight, based on the weight of the melamine-formaldehyde resole.

7. A composition as claimed in claim 1 containing also boron oxide in an amount of 2 to 20%, by weight, based on the weight of the melamine-formaldehyde resole.

8. A composition as claimed in claim 1 containing also aluminium hydroxide.

9. A composition as claimed in claim 1 modified in that up to 30% by weight of the melamine is replaced with urea.

10. A composition as claimed in claim 9 wherein the composition contains both a melamine-formaldehyde resole and a urea-formaldehyde resole.

11. A composition as claimed in claim 10 wherein the urea-formaldehyde resole has a mole ratio urea:formaldehyde in the range 1:1.6 to 1:2.

12. A composition as claimed in claim 9 wherein the melamine-formaldehyde resole is a melamine-urea-formaldehyde resole.

13. A method of forming shaped articles comprising moulding into shape a moulding composition as claimed in claim 1 and causing the resole to cure at a pH of at least 6.0.

14. A method as claimed in claim 13 wherein the curing is conducted at a pH in the range of 7.5 to 9.5.

15. A method as claimed in claim 13 wherein the mouldng composition is foamed prior to curing.

16. A composition as in claim 2 wherein the glycol is monopropylene glycol, dipropylene glycol or triethylene glycol and it is present in an amount between 30 and 70% by weight, based on the weight of the melamine-formaldehyde resole, and a mixer amount of water up to about 28% based on the weight of the melamine-formaldehyde resole.

17. A composition according to claim 16 wherein a portion of the melamine up to 30% by weight is replaced by urea, the urea being present as a urea-formaldehyde resole.

18. A composition according to claim 16 containing 2 to 20% by weight of boron oxide, based on the weight of the melamine-formaldehyde resole.

19. A composition according to claim 16 consisting essentially of the melamine-formaldehyde resole, the glycol, water.

20. A composition according to claim 16 consisting essentially of the melamine-formaldehyde resole, the glycol, water and at least one member of the group consisting of urea-formaldehyde resole, boron oxide, aluminum hydroxide and polyvinyl alcohol.

21. The product prepared by moulding the composition of claim 1.

22. The product prepared by moulding the composition of claim 16.

23. The product prepared by moulding the composition of claim 20.

* * * * *